United States Patent Office 3,483,270
Patented Dec. 9, 1969

3,483,270
STEREOSPECIFIC ORGANOSILOXANE-MACROMOLECULAR HYDROCARBON BLOCK COPOLYMERS
Edgar E. Bostick, Scotia, N.Y., assignor to General Electric Company, a corporation of New York
No Drawing. Filed Apr. 11, 1966, Ser. No. 541,538
Int. Cl. C08g 31/34, 31/09
U.S. Cl. 260—827         15 Claims

ABSTRACT OF THE DISCLOSURE

Cyclic trisiloxanes are reacted with a lithium-terminated macromolecular organic hydrocarbon segment to produce block copolymers containing an organic macromolecule and an organic segment, the organic segment being positioned in the polymer molecule with specificity. These polymers are useful as lubricants and as high temperature elastomers.

---

The present invention relates to sequentially arranged block-block copolymers containing organosiloxane segments and silicon-free organic segments (hereinafter referred to as "organic segments" or more specifically as "hydrocarbon segments"), and methods for preparing the same. More particularly, the invention relates to sequentially arranged preordained block copolymers in which at least 75% or more, and up to close to 100%, of the blocks in the polymer are of a preordained and regular nature and derived in essentially the same order and in the same relative amount as the cyclic organotrisiloxane and organic segment employed for making the aforesaid copolymers. The invention also encompasses a method for making the aforesaid block-block copolymers by effecting reaction between (a) a lithium-terminated macromolecular organic, e.g. hydrocarbon, segment and (b) a cyclic trisiloxane of the formula

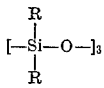

I the said reaction being preferably, although not necessarily, carried out at temperatures below 100° C. in an aprotic solvent for at least one of the reactants, where R may be the same or different organic radicals, and in addition to being free of aliphatic substituted halogen is a member selected from the class consisting of monovalent hydrocarbon radicals, cyanoalkyl radicals and halogenated aryl radicals.

It is known in the art that block copolymers containing organic segments and siloxane segments may have certain unique and useful properties, such as certain bulk properties as well as certain specific solvent properties. There are very few known references which describe the preparation of block copolymers composed of siloxane segments and organic segments. Generally, the usual method for achieving block copolymers of this type is to select preformed difunctional organic segments and to condense them with preformed difunctional siloxanes segments. However, this method is not too satisfactory because it leads to scrambling and randomizing of the segments, and inability to control the arrangement of the various segments in the final copolymer.

U.S. Patent 3,051,684, issued Aug. 28, 1962, discloses the preparation of block polymers from cyclic polysiloxanes and macromolecular preformed hydrocarbon segments. This reference teaches that in order to prepare block copolymers having macromolecular hydrocarbon segments and organosiloxane segments, one starts with a macromolecular hydrocarbon segment which is terminated by either a potassium, sodium, rubidium, or cesium atom. This preformed active macromolecular hydrocarbon segment is then reacted with a diorganocyclosiloxane in a solvating medium. Unfortunately, the use of these particular alkali metals as terminating agents results in extensive equilibration of the diorganosiloxane so that as the active centers are adding cyclics to form high polymer, there are other active centers which are interchanging with linear siloxane bonds to cause reproduction of new cyclics and in many cases considerable amounts of homopolymer segments. It is therefore easy to see that this contamination by homopolymer segments is a distinct disadvantage in such systems and in such compositions of matter where it would be highly advantageous to predict in advance the regularity and position of the particular hydrocarbon or organosiloxane segments. This process also suffers from the fact that yields are usually lower than desirable and molecular weights are not as controllable as desired. Due to the equilibration always present in the system, it has been necessary to remove solvent as the polymerization proceeds in order to increase both the molecular weight and the yield of polymer. This procedure, although obviating one difficulty does not eliminate the presence of homopolymer segments in the final product.

I have now discovered that by employing lithium as the alkali metal atom in place of the sodium, potassium, rubidium and cesium described in the aforementioned U.S. Patent 3,051,684, I am able to avoid the problems encountered by the use of the latter alkali metal atoms and for the first time, a quantitative block copolymer can be prepared having macromolecular organic segments connected to polydiorganosiloxane segments under controlled conditions of molecular weight and blocking, tending to 100% conversion and structural control, which is not attainable by the other alkali metal systems. Furthermore in accordance with my process, it is possible to preform the organic segment in a stereospecific manner and then to accelerate the reaction of the cyclotrisiloxane of Formula I with the organic segment by means of adding a solvating reagent without destroying the structure of the preformed segment or without effecting the loss of structural control in the polydiorganosiloxane segment.

In accordance with my invention, I first polymerize an olefinically unsaturated monomer (which term by definition is intended to include lithium-polymerizable organic compounds containing one or more —CH=CH— groups) in the presence of lithium or an organolithium compound under conditions whereby the monomer is converted to an organic polymer terminated at one or more points with the aforesaid lithium atom. This polymerization with the lithium compound (which is intended to include not only elemental lithium but also derivatives of lithium such as organolithium compounds capable of effecting polymerization of unsaturated monomers) can be carried out in any usual solvent employed for the purpose. Thus, a solvent used for making the polymer in the presence of a lithium compound can be any solvent which is inert to the reactants or to the reaction product such as, for instance, n-hexane, benzene, etc. Various methods are described in the prior art for polymerizing unsaturated organic monomers with alkali metal compounds. Thereafter, the lithium terminated organic polymer is interreacted with the cyclic trisiloxane of Formula I, preferably in the presence of an aprotic solvent, to obtain the block copolymer composed of organic, e.g., hydrocarbon, segments and of organosiloxanes segments.

The term "aprotic solvent" is intended to mean any organic solvent which has no active protons which may interfere with growing anionic polymerization centers. As will be evident to those skilled in the art, any aprotic solvent which is capable of dissolving the polymeric mixture and causing intimate contact of an additional diorganocyclosiloxane with the polymerizing system may be used. These may include such solvents as benzene, toluene, xylene, mesitylene, etc. The use of solvents having different boiling points allows the practice of this invention at variable temperatures. However, it is preferred that certain special dipolar aprotic solvents having electron-donating centers be employed. These solvents are chosen such that their electron-donating centers are capable of forming coordinated complexes with the lithium cation, thereby increasing its reactivity towards diorganocyclosiloxane polymerization without the loss of specificity in ring opening reactions. Aprotic solvents which have Lewis base characteristics are preferably employed because of their ability to donate electrons to the lithium cation, thereby coordinating with the lithium and enhancing its reactivity by virtue of such coordination.

Among the members which R may be in Formula I are, for instance, alkyl radicals (i.e., methyl, ethyl, propyl, isobutyl, hexyl, etc.); aryl radicals (e.g., phenyl, napthyl, biphenylyl, etc.); aralkyl radicals (i.e., benzyl, phenylethyl, etc.); alkaryl radicals (e.g., tolyl, xylyl, ethylphenyl, etc.); alkenyl radicals (e.g., vinyl allyl, methallyl, etc.); halogenated aryl radicals (e.g., chlorophenyl, tetrachlorophenyl, chloronaphthyl, tetrafluorophenyl, etc.); cyanoalkyl radicals (e.g., cyanoethyl, cyanopropyl, cyanobutyl, etc.); etc.

The number of cyclotrisiloxanes corresponding to Formula I which can be employed in the practice of the present invention can be varied widely. Among such cyclictrisiloxanes may be mentioned, for example, hexamethylcyclotrisiloxane, hexaphenylcyclotrisiloxane, cis- and trans-2,4,6 - trimethyl - 2,4,6-triphenylcyclotrisiloxane, various isomers of trimethyltriethylcyclotrisiloxane, various isomers of trimethyltrivinylcyclotrisiloxane, trimethyltri-($\beta$-cyanoethyl)cyclotrisiloxane, trimethyltri-(4 - chlorophenyl)cyclotrisiloxane, 2,4 - dimethyl-2,4,6,6-tetraphenylcyclotrisiloxane, etc.

Among the lithium compounds, including elemental lithium, which may be employed in the practice of the present invention for making the lithium-terminated organic polymer may be mentioned, for instance, lithium naphthalene, lithium anthracene, butyl lithium, lithium stilbene, 9-fluorenyl lithium, biphenyl lithium, 1,4-dilithiobenzene, 1,5-dilithiopentane, 1,5-dilithionaphthalene, 1,2-dilithio-1,3,3-triphenylpropane, 1,3,5-trilithiopentane, 1,3,5-trilithiobenzene, etc.

The unsaturated olefinic organic monomers which may be employed in the practice of the present invention from which block copolymers are formed, include both vinyl and diene monomers, for instance, styrene, butadiene, isoprene, 2,3-dimethylbutadiene, 1,3-pentadiene, chlorobutadienes, methylmethacrylate, methylacrylate, $\alpha$ - methylstyrene, 2,5-dichlorostyrene, vinyl toluene, allyl benzoate, allyl acetate, crotononitrile, acrylonitrile, methacrylonitrile, vinylidene chloride, acrylamide, etc. It will of course be apparent to those skilled in the art that many other vinyl and diene monomers which are well known in the art may be employed without departing from the scope of the invention. Homologues of the aforesaid monomers, including alkyl and aryl-substituted homologues, can also be used.

Among the preferred aprotic solvents which may be employed in the practice of this invention are non-acid oxygen-containing and nitrogen-containing organic solvents capable of coordinating with the lithium. These include, for instance, tetrahydrofuran (hereinafter referred to as "THF"), tetrahydropyrane, diethoxyethane, dimethyl ether of diethylene glycol, dimethyl acetamide, N-methylpyrrollidone, isobutylene oxide, dimethyl sulfoxide, dioxane, diethyl ether of diethylene glycol, various tertiary amines such as, for instance, dimethyl aniline, tributyl amine, pyridine, etc. Solvents which contain active hydrogen or an acid hydrogen should be avoided because of the reactivity of the lithium with the acidic hydrogen to produce new reaction centers and thereby causing a randomness in the mixture and reducing blocking or order contrary to the intent of this invention.

In carrying out the process, traces of water should be avoided and preferably anhydrous conditions and inert atmospheres should be employed in both the preparation of the organic segment polymer and in the coreaction with the cyclic polysiloxane. Other conditions, such as the presence of carbon dioxide, acids, and compounds containing acid producing groups should also be avoided since they destroy the lithium catalyst and tend to terminate the polymerization.

The process, whether homopolymerization of the unsaturated monomer or block copolymerization of the lithium derivative of the organic polymer segment with the cyclic polysiloxane, is preferably carried out at room temperatures and advantageously at temperatures ranging from about 10–35° C. Atmospheric pressures are usually employed, although superatmospheric and subatmospheric pressures as well as higher and lower temperatures are not precluded.

The block copolymers have polyorganosiloxane end segments due to the fact that they are lastly formed by the coreaction of the lithium derivative of the organic segment with the cyclic polysiloxane. These block copolymers have single polyvinyl or polydiene segments between these end segments, or polysiloxane segments alternating with polyvinyl or polydiene segments between the end segments. If desired other polymer segments may be included between the polyorganosiloxane and the polyvinyl or polydiene segments. The ratio of the weight of the individual polyorgano-siloxane segments in the block copolymer may be varied widely. Generally, the percentage weight of the organic, e.g., polyvinyl or polydiene segment or segments, should be at least 2 or 3% to have an impact on the properties of the block copolymer and to provide additional sites for either peroxide, sulfur, or high energy radiation curing or vulcanization. Alternatively, the percentage weight of the one or more polyvinyl or polydiene segments may be as much as 95%. In the extremely lower proportion of percentages of the polysiloxane, large amounts of the organic segment will not ordinarily be materially affected by extremely small amounts of the polysiloxane segment. However, as the amount of the polysiloxane increases, say from about 5% or higher, of the total weight of the segments, the properties of the block copolymer are materially affected particularly the water-repellant characteristics and the frictional properties.

However, it should be recognized that the presence of small percentages of polysiloxane segments, particularly terminal polysiloxane segments offers unique opportunity for additional chemical reactions. For example, the polysiloxane segment with a terminal $\equiv$Si—OH group can have a useful means for preparing room temperature vulcanizing compositions which contain for the most part organic segments and a minimal amount of polysiloxane segments.

The manner in which my invention may be practiced may be varied widely. First the organic, e.g., the hydrocarbon, segment is prepared by mixing together the lithium compound with the particular monomer employed. The lithium compound can comprise only that amount necessary to effect polymerization of the monomer, for instance, from about 0.00001 to 0.3 mole of lithium catalyst or initiator, per mole of the unsaturated monomer. The unsaturated monomer rendered substantially anhydrous and oxygen-free, is mixed with the lithium compound and then allowed to polymerize under an inert atmosphere, at temperatures used for that purpose, for instance, at temperatures ranging from about −50 to 20° C. for periods of time ranging from about several minutes to several days. Thereafter, the lithium solution of the organic polymer is then added to the cyclic trisiloxane in the aprotic solvent, and the mixture of ingredients is allowed to interact advantageously at temperatures around room temperature and preferably below 100° C. This kind of reaction may take from a few minutes to several days until the block copolymer is obtained. Thereafter, to insure completion of the reaction, the mixture of ingredients is heated at elevated temperatures ranging from about 100 to 200° C. for a period of several minutes to several hours, and the polymer can then be isolated by the usual means employing differential solvents for the purpose. Small traces of bound lithium can be tolerated in many applications and processes utilizing the polymer since these terminal lithium ions are easily displaced and thereby rendered relatively inert by reactions described hereinafter.

The block copolymers obtained with dienes, i.e. copolymers composed of polydiene segments and polysiloxane segments, are vulcanizable by usual means for vulcanizing hydrocarbon rubbers, for instance, sulfur as well as other chemical materials for the purpose. Other vulcanization accelerators normally used in place of sulfur include, for instance, disulfides, alkyl phenol sulfides, p-dinitrosobenzene, sulfur dichloride, tetramethyl thiuram disulfide, tetraethyl thiuram disulfide, etc. In general this can be accomplished by milling the block copolymer with or without filler and the usual vulcanizing agent and then heating it at vulcanizing temperatures on the order of about 125–175° C. for times ranging from 5–30 minutes, preferably under pressure to obtain heat-cured vulcanized products. The use of accelerators for vulcanization such as phenyl beta-naphthylamine, triphenyl phosphite, etc., as well as usual fillers, for example, silica, clay, titanium dioxide, etc., is not precluded.

The block copolymers obtained from vinyl monomers and the cyclic trisiloxane can be cured with the usual curing agent employed to cure polysiloxanes. Included among these are di-(α-cumyl) peroxide, benzoyl peroxide, bis-(2,4-dichlorobenzoyl) peroxide, tertiary butyl perbenzoate, high energy radiation, etc. Again these materials can be compounded with various additives, such as stabilizers, plasticizers, fillers, etc., to obtain useful compositions.

In order that those skilled in the art may better understand how the present invention may be practiced, the following examples are given by way of illustration and not by way of limitation. All parts and percentages are by weight unless otherwise stated.

EXAMPLE 1

45 grams (0.433 mole) styrene was distilled from calcium hydride in vacuo and isolated in a break-seal equipped Pyrex bulb. The styrene was then mixed with 50 ml. anhydrous degassed cyclohexane containing $1.67 \times 10^{-3}$ mole n-butyl lithium. The reaction mixture was sealed off in a break-seal equipped round-bottom flask and allowed to polymerize at −40° C. for 4 days with shaking. The active polystyryl lithium solution thus obtained was used to make a terpolymer as follows. 6 grams (0.027 mole) hexamethylcyclotrisiloxane was dissolved in 10 ml. dry, freshly distilled tetrahydrofuran and heated to distill off a few ml. tetrahydrofuran. An additional 8 ml. dry tetrahydrofuran was added and ⅓ of the active polystyryl lithium solution described above was added to the reaction mixture. The reaction mixture was shaken and allowed to interact for about 15 hours to obtain a block copolymer of polystyrene and of the hexamethyltrisiloxane segment. At this point, the block copolymer can be represented as follows:

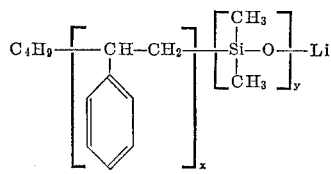

where $x$ and $y$ represent repetitive units of the polystyryl unit and of the siloxane unit, respectively. Thereafter, 4-grams (0.00675 mole) hexaphenylcyclotrisiloxane dissolved in dried 20 ml. benzene (distilled from calcium hydride) was added to the reaction mixture. The reaction mixture was stirred and heated at its reflux temperature for about one hour. The solvent was then removed and the mixture was heated at 200° C. for about 4 hours. The reaction product was cooled and then dissolved in hot benzene and precipitated with methanol to yield 90% of a block terpolymer comprising a white, hard resin. This polymer can be represented by the following formula:

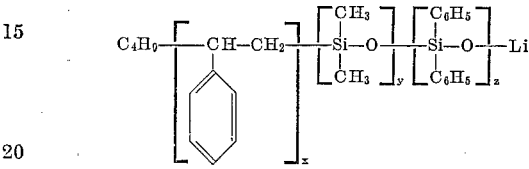

where $x$ and $y$ have the meanings above; and $z$ represents the molar concentration of the diphenyl siloxane block introduced into the terpolymer. By virtue of the use of the lithium, no randomization was detected in the terpolymer and the segments were present in the same position and order in which they were introduced, and in the same amounts as were used essentially by the reaction conditions recited above. If, for instance, potassium had been employed in place of lithium, there would have been a random distribution of the dimethylsiloxy and diphenylsiloxy units due to equilibration and cyclization, outside the arrangement and order in which they were introduced by means of the cyclic trisiloxanes.

EXAMPLE 2

Employing the procedure described in Example 1, an active polystyryl lithium solution was prepared by mixing together 5 ml. dry, freshly distilled styrene and 2 millimoles n-butyl lithium and 40 ml. dry cyclohexane, and stirring the reaction mixture at −20 to −30° C. for about 48 hours. To approximately 3 grams of this active polystyryl lithium solution was added 5 grams cis-2,4,6-trimethyl-2,4,6-triphenylcyclotrisiloxane in 5 ml. THF (dried over CaH₂). After about 15 minutes of stirring, the solvent was removed by means of vacuum to a residual volume of 10 ml. After further stirring for about 16 hours, about 20 ml. benzene containing a few drops of glacial acetic acid was added, the resulting mixture poured into methanol to precipitate a hard, white resin softening at about 60–100° C. A sample of the polymer was refluxed in methyl ethyl ketone until a white floc separated. The methyl ethyl ketone insoluble portion was analyzed by differential scanning calorimetry. The heat capacity curves indicated two crystalline transitions for the methyl ethyl ketone insoluble block copolymer—$T_{M}=100°$ C., $T_{M2}=228°$ C. NMR spectra of the block copolymer indicated high isotactic content (>60%) for the methyl phenyl siloxane block. This polymer was composed of polystyryl blocks and methyl phenyl siloxane blocks, the latter blocks being regularly spaced in accordance with the molar concentration used.

EXAMPLE 3

Isoprene was polymerized in a closed reaction vessel dissolved in hexane employing butyl lithium for polymerization purposes. This yielded a polyisoprene which had a preponderance of connections which were cis-1,4. Thereafter, cis - 2,4,6 - trimethyl-2,4,6-triphenylcyclotrisiloxane dissolved in tetrahydrofuran was added and the mixture of ingredients then interreacted similarly as was done in Example 1. The resulting polymerization adds a polymethylphenylsiloxane segment to the reactive hydrocarbon segment, whereby the siloxane segment was ⅔ isotractic and ⅓ heterotactic in conformation of the methylphenylsiloxane units. This polymerization proceeded to quantitative conversion in contrast to much lower conversion if other strong alkali-metal catalyzed systems, such as potassium, had been employed in place of the lithium. No evidence of homopolymer segments was found in the system which would have a profound effect on the ultimate properties of the block copolymer.

The following example shows the preparation of the block terpolymer, poly-(diphenylsiloxane-block-dimethylsiloxane - block - styrene - block-dimethylsiloxane-block-diphenylsiloxane) which when represented by letters is of the ABCCBA type, where A represents diphenylsiloxy units, B represents dimethylsiloxy units and C represents the polystyryl unit.

EXAMPLE 4

About 18 grams (0.173 mole) styrene was dissolved in 130 ml. dry benzene and polymerized with dilithio stilbene (0.0002 mole) and 0° to 27° C. in one hour. Thereafter, 20 grams (0.009 mole) hexamethylcyclotrisiloxane dissolved in 100 ml. THF was added to the polystyryl reaction mixture and allowed to polymerize with stirring for about 18 hours. Thereafter, 15 grams (0.01685 mole) hexaphenylcyclotrisiloxane dissolved in 100 ml. THF was added and the mixture thoroughly stirred for about 2 hours to insure complete interaction. The solvent was then removed under a nitrogen stream, and the resulting polymer mixture was heated to 200° C. for 4 hours to insure completion of the reaction. The reaction mixture was cooled and thereafter worked up by extraction with n-hexane containing a trace of glacial acetic acid. The yield of benzene-soluble block terpolymer was greater than 90%. This polymer formed white, flexible, crystalline, solvent-resistant sheets when pressed at 250° C. at 5,000 p.s.i. for about 15 minutes and subsequently quenched in cold water.

This example shows the preparation of a poly(dimethylsiloxane-block-isoprene-block-dimethylsiloxane).

EXAMPLE 5

34 grams (0.5 mole) isoprene was distilled in vacuo from a fresh sodium mirror to a flask where it was polymerized with 0.0002 mole dilithio stilbene in 200 ml. anhydrous n-hexane for about 16 hours at room temperature to form a viscous solution of the polyisoprene. Thereafter, 14.8 grams (0.067 mole) hexamethylcyclotrisiloxane (sublimed from calcium hydride) was added to the reaction mixture, the latter diluted with 100 ml. anhydrous THF and the reaction mixture was stirred at room temperature for about 16 hours. About 50 ml. benzene containing 0.1 ml. glacial acetic acid was added to dissolve and neutralize the reaction mixture. The polymer was recovered by pouring the solution into carbon dioxide saturated methanol, dried under vacuum to give 48 grams of the block copolymer. This polymer was ascertained to be of a block purity of at least 96.5%. About 5 grams of this polymer dissolved in benzene was reacted with 0.5 ml. methyltriacetoxysilane, and subsequent drying in nitrogen plus one hour exposure to atmospheric (moisture) conditions resulted in a crosslinked benzene-insoluble film. This polymer (i.e. prior to treatment with the methyltriacetoxysilane) was a difunctional material and could be used as a room temperature-vulcanizable composition.

The reactions exemplified by the foregoing description and examples have other applications. One outstanding use is in the preparation of difunctional segments which can be used as intermediates for room temperature vulcanizates. If one wishes to prepare a hydrocarbon system for room temperature vulcanization, one prepolymerizes a vinyl or di-olefin compound with a difunctional organolithium catalyst to produce a macromolecular hydrocarbon chain which has reactive positions at both terminals, i.e., it has lithium atoms at both ends of the polymer chain. Then one adds a cyclic polysiloxane in the manner described above to produce a diorganosiloxane segment at each end of the hydrocarbon polymer chain. When this chain is terminated with a weak acid or any other proton source, a macromolecular segment is achieved which has a hydrocarbon interior and terminal siloxane segments which may then be reacted with proper crosslinking agents to give a hydrocarbon room temperature vulcanizate. Current methods for producing this type of system have relied almost entirely on condensation techniques and have been most difficult to control and present many problems in synthesis. Further advantage of this system lies in the fact that there may not be any work-up process necessary before adding the crosslinking reagent. For example, one may take the system as received from the reaction, and treat this mixture with the multifunctional crosslinker to produce a vulcanizate having tough, flexible characteristics. There are many other uses of such a system, which may include the preparation of block hydrocarbon-siloxane fluids (useful for lubricating puroses), resins, and high temperature elastomers. By the incorporation of sterically controlled hydrocarbon and siloxane segments, one can achieve structure control which has not been attainable by other strong alkali-metal polymerization systems.

The lithium block copolymer or terpolymer composed of organic segments and of siloxane segments can be treated in various ways to obtain a polymer free of lithium atoms. Thus, the final lithium polymer can be reacted with an acid, such as glacial acetic acid, to replace the lithium atom with a hydrogen atom to form a hydroxyl terminated polysiloxane or copolymer, Alternatively, if one wishes to have a triorganosilyl or similar terminating organosilicon group, one can react the lithium atom of the finally obtained lithium polymer with, for instance, a triorganohalosilane, such as trimethylchlorosilane, triphenyl chlorosilane, etc., to obtain lithium chloride and a chain-terminating triorganosilyl group. This can lead to stable fluids having unusual characteristics, especially if highly isotactic structures in excess of 65% isotacity are present as a result of being able to maintain the high degree of isotacity from the reaction of the lithium compound with the polymerizable monomer (to form the lithiated organic segment) and ultimately with the polysiloxane segment. To insure complete removal of the glacial acetic acid, a wash with methanol particularly with a 90–10%, by weight, mixture of methanol and water will remove any residual glacial acetic acid which may be present in the polymer.

The block copolymers obtained herein particularly in the cured state can be employed in the manufacture of high temperature sealings (e.g., gaskets, rings, etc.), tubing, fuel lines, insulation, motor mountings and a multitude of molded and extruded products.

The products of the present invention have unusual strengths and elongations even in the unfilled state, when converted to the cured condition by means of the crosslinking agents normally employed for the purpose. The crystallinity introduced by means of the regularity of the polymers herein prepared again imparts a unique characteristic which is not found, to the best of my knowledge, in polymers in the prior art containing equivalent organosiloxane and organic segment content but in a different configuration.

What I claim as new and desire to secure by Letters Patent of the United States is:

1. A linear block copolymer consisting essentially of chemically-combined sequentially arranged blocks of (A) polydiorganosiloxane, and (B) organic polymer, having from 5 to 98 percent by weight of (A) and from 2 to 95 percent by weight of (B), which linear block copolymer is produced by the anionic polymerization of (C), olefinically unsaturated organic monomer, and (D), organocyclotrisiloxane utilizing a lithium carbanion producing catalyst, where (C) is a member selected from the class consisting of styrene, butadiene, isoprene, 2,3- dimethylbutadiene, 1,3 - pentadiene, chlorobutadienes, alkylmethacrylates, alkylacrylates, α-methylstyrene, 2,5-dichlorostyrene, vinyltoluene, allylbenzoate, allylacetate, crotononitrile, and acrylonitrile, methacrylonitrile, vinylidenechloride, acrylamide, and (D) has the formula,

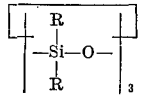

where R is attached to silicon by carbon silicon linkages and selected from the class consisting of monovalent hydrocarbon radicals, cyanoalkyl radicals and halogenated aryl radicals.

2. A linear block copolymer in accordance with claim 1, where the polydiorganosiloxane block is a polydimethylsiloxane block.

3. A linear block copolymer in accordance with claim 1, consisting essentially of blocks of polydiorganosiloxane and polystyrene.

4. A linear block copolymer in accordance with claim 1, consisting essentially of blocks of polydiorganosiloxane and polyisoprene.

5. A linear block copolymer in accordance with claim 1, consisting essentially of blocks of polydiorganosiloxane having a mixture of methyl and phenyl radicals attached to silicon and polymerized vinyl organic monomer.

6. A linear block copolymer in accordance with claim 1, consisting essentially of blocks of polydimethylsiloxane, polydiphenylsiloxane and polymerized vinyl organic monomer.

7. A linear block copolymer in accordance with claim 1, consisting essentially of blocks of polydimethylsiloxane, polydiphenylsiloxane and polyisoprene.

8. A process for making a linear block copolymer consisting essentially of chemically-combined sequentially arranged blocks of (A) polydiorganosiloxane and (B) organic polymer, having from 5 to 98 percent by weight of (A) and from 2 to 95 percent by weight of (B) which process comprises (1) producing a lithium-terminated organic polymer by effecting the anionic polymerization of (C) an olefinicially unsaturated organic monomer in an aprotic solvent utilizing a lithium carbanion producing catalyst for (C) which is a member selected from the class consisting of styrene, butadiene, isoprene, 2,3-dimethylbutadiene, 1,3-pentadiene, chlorobutadienes, alkylmethacrylates, alkylacrylates, α-methylstyrene, 2,5-dichlorostyrene, vinyltoluene, allylbenzoate, allylacetate, crotononitrile, acrylonitrile, methacrylonitrile, vinylidenechloride, and acrylamide, and (2) effecting reaction between the lithium-terminated organic polymer of (1) and a cyclotrisiloxane of the formula,

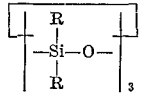

where R is an organic radical selected from the class consisting of monovalent hydrocarbon radicals, cyanoalkyl radicals and halogenated aryl radicals.

9. The process as in claim 8 in which the lithium-terminated organic polymer is lithium-terminated polystyrene.

10. The process as in claim 8 in which the lithium-terminated organic polymer is lithium-terminated polyisoprene.

11. The process os in claim 8 wherein hexaphenylcyclotrisiloxane is reacted with the reaction product of the lithium-terminated organic polymer and hexamethylcyclotrisiloxane.

12. The process as in claim 8 in which hexaphenylcyclotrisiloxane is reacted with the reaction product of the lithium-terminated polyisoprene and hexamethylcyclotrisiloxane.

13. The process as in claim 8 in which the cyclic trisiloxane is hexamethylcyclotrisiloxane.

14. The process as in claim 8 in which the aprotic solvent is tetrahydrofuran.

15. The process as in claim 8 in which the cyclic trisiloxane is cis-2,4,6-trimethyl - 2,4,6 - triphenylcyclotrisiloxane.

References Cited

UNITED STATES PATENTS 3,051,684    8/1962    Morton _____ 260—827

FOREIGN PATENTS 856,581    12/1960    Great Britain.

MURRAY TILLMAN, Primary Examiner

PAUL LIEBERMAN, Assistant Examiner

U.S. Cl. X.R.

260—30.2, 30.4, 30.8, 32.6, 33.2, 33.4, 37, 41, 46.5